United States Patent
Toffolo et al.

[11] Patent Number: 5,920,256
[45] Date of Patent: Jul. 6, 1999

[54] GAUGE WITH MECHANICAL INDICATOR AND RECONFIGURABLE GAUGE DISPLAY

[75] Inventors: Daniel J. Toffolo, Dearborn; Silviu Palalau, Birmingham; Richard Chutorash, Rochester Hills, all of Mich.

[73] Assignee: UT Automotive Dearborn, Inc., Dearborn, Mich.

[21] Appl. No.: 08/826,928

[22] Filed: Apr. 8, 1997

[51] Int. Cl.⁶ .................................................. B60Q 1/00
[52] U.S. Cl. .................. 340/461; 340/525; 340/815.55; 345/4; 345/5; 345/105
[58] Field of Search .................................. 340/525, 461, 340/462, 815.78, 815.55, 815.47; 345/4, 5, 105; 324/115

[56] References Cited

U.S. PATENT DOCUMENTS

| | | | |
|---|---|---|---|
| 3,689,835 | 9/1972 | Bickfrod | 324/115 |
| 3,839,857 | 10/1974 | Berets et al. | 345/105 |
| 4,001,776 | 1/1977 | Carol, Jr. et al. | 340/525 |
| 4,006,969 | 2/1977 | Kouchi et al. | 345/4 |
| 4,055,141 | 10/1977 | Homs | 116/129 |
| 4,254,375 | 3/1981 | Matsuoka | 324/115 |
| 4,371,870 | 2/1983 | Biferno | 345/4 |
| 4,562,433 | 12/1985 | Biferno | 345/4 |
| 4,568,928 | 2/1986 | Biferno | 345/5 |
| 4,968,930 | 11/1990 | Grupp et al. | 324/115 |
| 5,079,509 | 1/1992 | Marsh | 324/115 |
| 5,578,985 | 11/1996 | Cremers et al. | 340/525 |
| 5,696,704 | 12/1997 | Semrau | 364/561 |

FOREIGN PATENT DOCUMENTS 0602962 6/1994 European Pat. Off. .
3732144 4/1989 Germany .

*Primary Examiner*—Jeffery A. Hofsass
*Assistant Examiner*—Sihong Huang
*Attorney, Agent, or Firm*—Howard & Howard

[57] ABSTRACT

A vehicle gauge comprises a mechanical indicator moveable relative to a reconfigurable gauge display. A transparent electroluminescent display selectively provides one of a plurality of gauge displays. A mechanical indicator positioned behind the display moves relative to the gauge display based upon data from a sensor associated with the current gauge display. A selectively transmissive device positioned between the display and the indicator selectively hides the indicator from view, providing a display independent of the indicator.

21 Claims, 2 Drawing Sheets

GAUGE WITH MECHANICAL INDICATOR AND RECONFIGURABLE GAUGE DISPLAY

BACKGROUND OF THE INVENTION

The present invention relates to a gauge having a mechanical indicator moveable relative to a reconfigurable gauge display.

Instrument panels in vehicles traditionally include mechanical indicators moveable relative to a fixed gauge display. For example, the speedometer typically includes an indicator needle moveable rotatably relative to a fixed gauge display having a plurality of indicia disposed about the periphery of the indicator needle travel. As is well known, the needle moves rotatably relative to the gauge display based upon a speed sensor in the vehicle.

Many current vehicles now provide reconfigurable displays which display a graphic representation of the traditional mechanical indicator. The reconfigurable displays permit the user to select different gauges to be displayed (speed, battery, oil pressure) or change the units of measure (MPH to KPH). However, unless an expensive very high resolution display is utilized, the graphic representation of the indicator needle is unsatisfactory. Typically, when the graphic representation of the needle is displayed other than purely horizontal or vertical, the pixels become prominent and the needle appears jagged. Further, movement of the graphic needle, which must move at least one pixel at a time, does not have the smooth, continuous movement of a traditional mechanical indicator needle.

SUMMARY OF THE INVENTION

The present invention provides a gauge having a mechanical indicator movable adjacent a reconfigurable gauge display. The display selectively displays one of a plurality of gauge displays adjacent the mechanical indicator. The mechanical indicator moves relative to the display based upon information from a sensor associated with the particular gauge display.

The gauge preferably includes a controller receiving data from a plurality of sensors and other sources. The controller is connected to a high resolution reconfigurable display, preferably a transparent electroluminescent display positioned in front of a mechanical indicator, such as an indicator needle. Preferably, a selectively variable transmissive device is disposed between the display and the indicator. The selectively variable transmissive device preferably comprises an electrochromic dimmer. When transmissive the variable transmissive device permits the viewing of the mechanical indicator through the display. When the variable transmissive device is opaque, the mechanical indicator is not visible, and the display can be used to display other information without the mechanical indicator. Preferably a second gauge is positioned adjacent the first gauge, with the display providing a second gauge display adjacent a second mechanical indicator.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
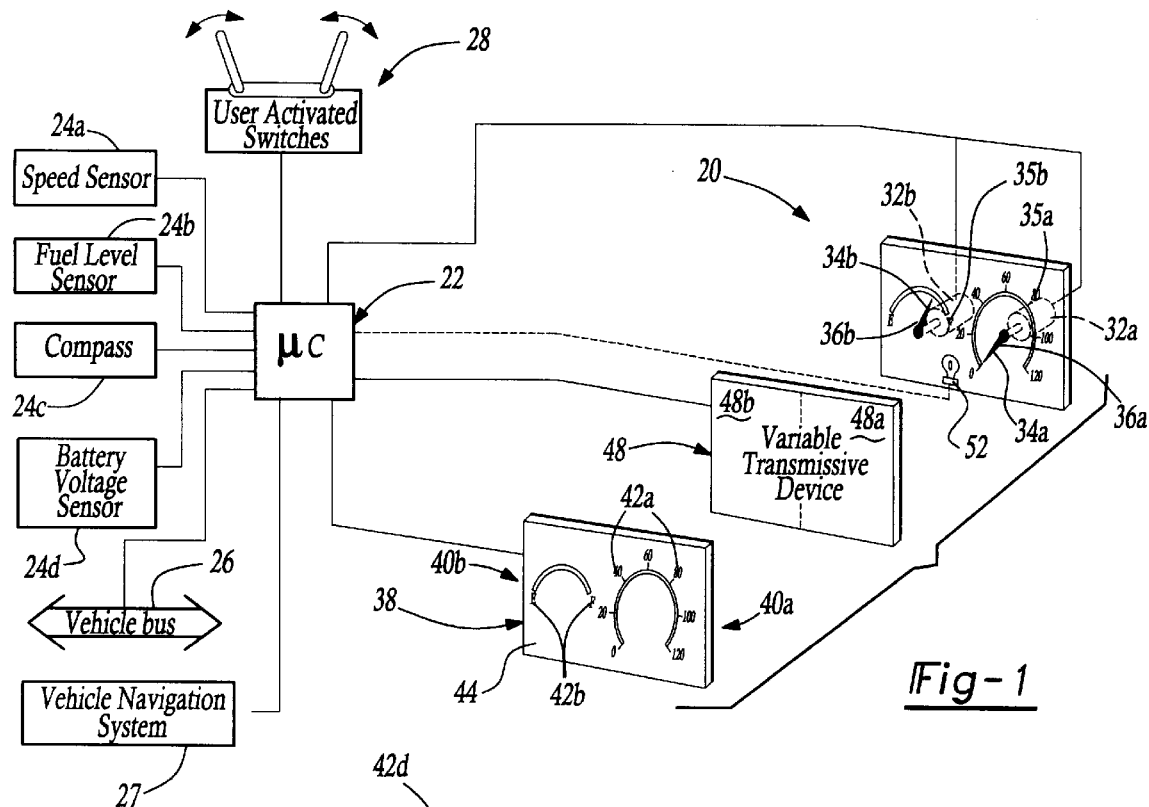
FIG. 1 is a schematic of the gauge of the present invention.

A vehicle gauge 20 according to the present invention is shown in FIG. 1. A controller 22 receives data from a plurality of sensors 24 mounted on the vehicle, such as a vehicle speed sensor 24a, fuel level sensor 24b, a compass 24c, and a battery voltage sensor 24d. The controller 22 preferably also receives additional vehicle information from a vehicle bus 26, and a vehicle navigation system 27. One or more user activated switches 28 permit the user to select which sensor data will be displayed. The controller 22 may be a microprocessor or logic circuit.

The controller 22 controls a motor 32a to move a mechanical indicator 34a, such as a needle. Preferably a digitally controlled motor 32a, such as a stepper motor, is utilized. Alternatively, a servo motor or other known means for moving an indicator 34 could be used. Non-reconfigurable, light-emitting backup gauge displays 35a, such as LEDs, indicate miles-per-hour about the periphery of the indicator 34a travel. One or more LEDs 36a or other light sources may optionally be mounted on the indicator 34a. Alternatively, the LEDs 36a or light sources may be adjacent the indicator 34a. A display 38, preferably a transparent electroluminescent display such as is known in the art, is positioned in front of the indicator 34a. The display 38 selectively displays, among other things, one of a plurality of gauge displays 40a, such as miles-per-hour 40a, having indicia 42a. The display 38 is viewed by the user from a front 44 of the display 38. The display 38 is preferably mounted in front of the indicator 34a.

A variable transmissive device 48 is preferably disposed between the display 38 and the indicator 34. The variable transmissive device 48 preferably comprises an electrochromic dimmer or LCD, such as is known in the art. The variable transmissive device 48 preferably provides transmissivity variable between approximately 0.85 to 0.05. Alternatively, the variable transmissive device 48 can comprise a shear material which may be illuminated by a light source 52 behind the transmissive device 48. Selective operation of the light source 52 by the controller 22 behind the transmissive device 48 selectively hides or makes visible the indicator 34 from the front of the display 38.

Preferably a second mechanical indicator 34b is positioned adjacent the mechanical indicator 34a. The display 38 further displays a gauge display 40b corresponding to input from the fuel-level sensor 24b. The controller 22 controls the motor 32b to move indicator 34b based upon data from another sensor, such as the fuel-level sensor 24b, or whichever sensor 24 is associated with a current gauge display 40. Non-reconfigurable, light-emitting backup gauge displays 35b, such as LEDs, indicate fuel levels about the periphery of the indicator 34b travel. The indicator 34b may include one or more LED's 36b or other light sources. Alternatively, the LEDs 36b or light sources may be adjacent the indicator 34b. Preferably, the variable transmissive device 48 is partitioned such that the transmissivity of a right portion 48a is variable independently of a left portion 48b.

In operation, the display 38 displays each gauge display 40 corresponding to one of the vehicle sensors 24, and the associated indicator 34 is moved based upon data received from the sensor 24 corresponding to the gauge display 40. The controller 22 controls the motor 32 to move the indicator 34 rotatably to point to the appropriate indicia 42 in the gauge display 40 based upon data from the sensor 24. The visibility of the indicator 34 through the variable transmissive medium 48 and display 38 is increased by the LED's 36 on the indicator 34, particularly at night. When selected by a user activated switch 28 or when determined appropriate by the controller 22, the controller 22 changes the display 38 to indicate different gauge displays 40. At the same time, the controller 22 modifies the position of the associated indicator 34.

Figure 2:
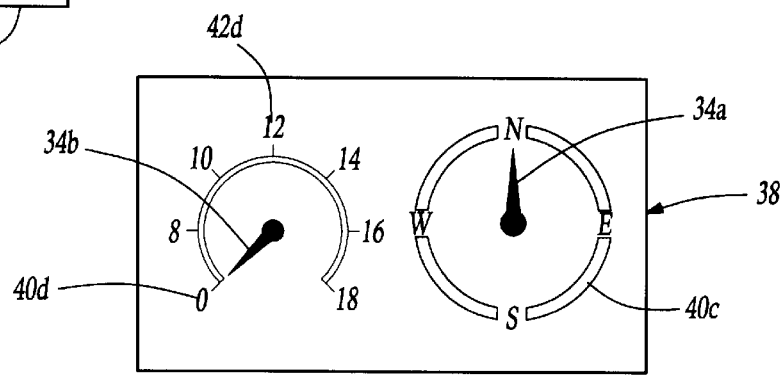
FIG. 2 is a front view of one configuration of the display and indicators of FIG. 1.

For example, when selected by a user activated switch 28 or when determined to be appropriate by the controller 22, the controller 22 changes the display 38 to indicate the compass 40c as shown in FIG. 2. At the same time, the controller 22 modifies the position of the indicator 34a to indicate the direction of vehicle travel based upon data from the compass sensor 24c. The controller 22 may also change the gauge display 40b on display 38 to the gauge display 40d for battery voltage. At the same time, the controller 22 moves the indicator 34b to reflect data received from a battery voltage sensor 24d. The gauge then displays battery voltage utilizing the reconfigurable display 38 and indicator 34b.

Figure 3:
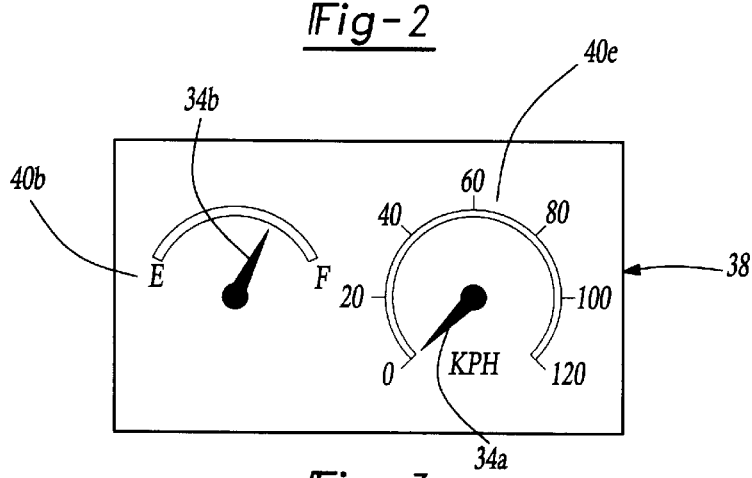
FIG. 3 is another configuration of the display and indicators of FIG. 1.

Upon selection by a user activated switch 28 or when determined to be appropriate by the controller 22, the controller changes the display 38 to display a gauge display 40e for kilometers per hour as shown in FIG. 3. At the same time, the controller 22 changes the position of the indicator 34 to indicate the current speed of the vehicle in kilometers per hour in conjunction with the gauge display 40e.

Figure 4:
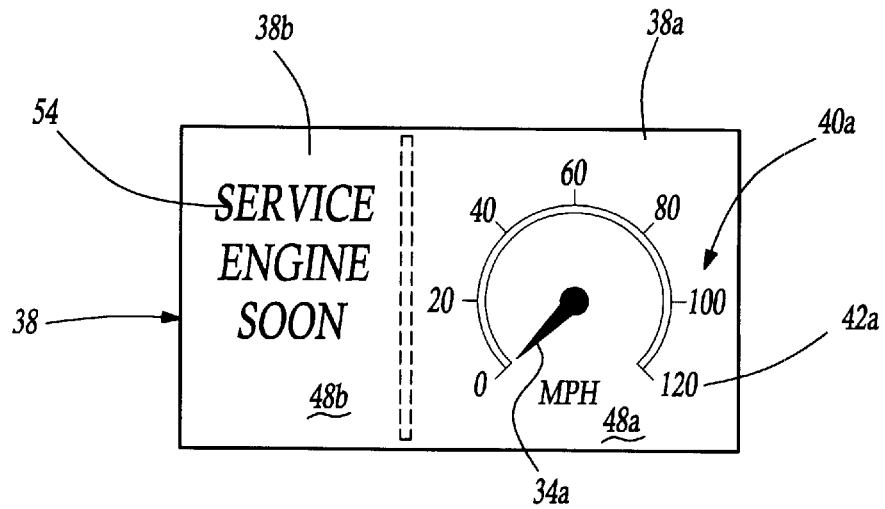
FIG. 4 is another configuration of the display and indicators of FIG. 1.

As shown in FIG. 4, the left portion 48b of the variable transmissive device 48 can be selected to become opaque by the controller 22 or manually via switches 28. Information 54 can then be displayed by display 38 on the left portion 38b of the display independent of the indicator 34b. It should be apparent the right portion 48a of the variable transmissive device could also be made opaque to display information on the right portion 38a of the display 38 independent of the indicator 34a.

Figure 5:
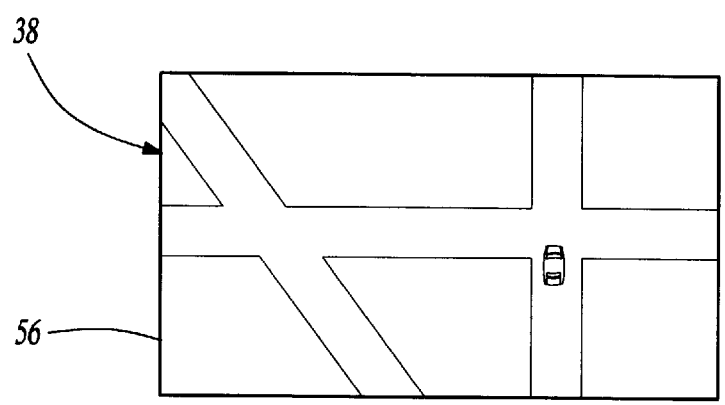
FIG. 5 is another configuration of the display of FIG. 1, wherein the indicators are hidden.

As shown in FIG. 5, when selected by a user activated switch 28 or when determined to be appropriate by the controller 22, the entire variable transmissive device 48 becomes relatively opaque based upon a signal from the controller 22, thereby hiding the indicators 34a–b. The display 38 can display information 56 based upon data from the navigation system 27, such as a map and the location of the vehicle, on the display 38 without the indicator 34 being visible. It should be apparent that the display 38 can then be used to display any information, such as text or other graphics, when the indicator 34 is obscured by the variable transmissive device 48.

Figure 6:
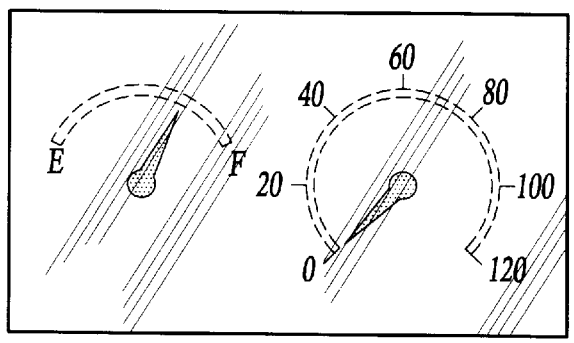
FIG. 6 is another mode of operation of the gauge of FIG. 1.

Referring to FIG. 6, if the electroluminescent display 38 should fail during operation, the controller 22 takes several steps automatically or by manual selection with switches 28. First the variable transmissive device 48 becomes transparent. The backup gauge displays 35a–b are turned on to provide a backup gauge display, so that the gauge 20 can provide fuel level and speed information at all times, even if the display 38 should fail. Light from the backup gauge displays 35a–b is visible through front surface 44.

It should be apparent that any number of mechanical indicators 34 could be positioned adjacent the display 38 and that more than one display 38 could also be utilized. The variable transmissive medium 48 could be partitioned for each indicator 34, so that any indicator 34 could be selectively obscured.

In accordance with the provisions of the patent statutes, the present invention has been described in what is considered to represent a preferred embodiment. However, it should be noted that the invention can be practiced otherwise than as specifically illustrated and described without departing from its spirit or scope.

We claim:

1. A gauge comprising:
   a reconfigurable display including a plurality of pixels which can be selectively switched on or off;
   a controller receiving first data from a first sensor;
   a mechanical indicator being positioned behind said display, said indicator movable relative to said display, said controller controlling said pixels of said display to display a first gauge display associated with said first sensor, said controller moving said indicator relative to said first gauge display based upon said first data from said first sensor, the position of said indicator relative to said display being visible simultaneously with said first gauge display.

2. The gauge of claim 1 wherein said controller receives second data from a second sensor, said controller controlling said pixels of said display to selectively display said first gauge display or a second gauge display associated with said second sensor, said controller moving said indicator relative to said second gauge display based upon said second data from said second sensor, the position of said indicator relative to said display being visible simultaneously with said second gauge display.

3. The gauge of claim 1 further including a selectively variable transmissive device between said display and said indicator.

4. The gauge of claim 3 wherein said selectively variable transmissive device is an electrochromic dimmer.

5. The gauge of claim 3 wherein said controller controls said selectively variable transmissive device, said variable transmissive device becoming opaque to hide said indicator when said display is displaying a third display independent of said indicator.

6. The gauge of claim 1 wherein said display is a transparent electroluminescent display.

7. The gauge of claim 1 wherein said indicator is positioned behind said display, said indicator being visible through said display from a position in front of said display.

8. The gauge of claim 7 wherein said indicator includes at least one light source mounted on said indicator.

9. The gauge of claim 1 further including a second mechanical indicator adjacent said display, said controller controlling said display to selectively display a third gauge display associated with a second sensor, said controller moving said second indicator relative to said gauge display based upon data from said second sensor.

10. The gauge of claim 9 further including a selectively variable transmissive device between said display and said first and second indicators, said selectively variable transmissive device having a first portion in front of said first indicator and a second portion in front of said second indicator, the transmissivity of said first and second portions of said variable transmissive device being independently variable by said controller.

11. The gauge of claim 1 wherein said pixels of said display selectively generate light.

12. The gauge of claim 1 wherein said display is an electroluminescent display.

13. A vehicle display comprising:

a reconfigurable transparent display;

a controller receiving first data from a first sensor and second data from a second sensor, said controller controlling said display to selectively display a first gauge display associated with said first sensor or a second gauge display associated with said second sensor;

a mechanical indicator behind said display, said indicator being visible through said display from a position in front of said display, said indicator movable relative to said display, said controller moving said indicator relative to said first gauge display based upon said first data from said first sensor when said first gauge display is displayed on said display, said indicator visible simultaneously with said first gauge display when said first gauge display is displayed, said controller moving said indicator relative to said second gauge display based upon said second data from said second sensor when said second gauge display is displayed by said display, said indicator visible simultaneously with said second gauge display when said second gauge display is displayed.

14. The vehicle display of claim 13 wherein said display is an electroluminescent display.

15. The vehicle display of claim 13 wherein said indicator includes at least one LED mounted on said indicator.

16. The vehicle display of claim 13 further including a selectively variable transmissive device between said display and said indicator.

17. The vehicle display of claim 16 wherein said selectively variable transmissive device is an electrochromic dimmer.

18. The vehicle display claim 16 wherein said controller controls said selectively variable transmissive device, said variable transmissive device becoming opaque to hide said indicator when said display is displaying a third display independent of said indicator.

19. A method for displaying information including the steps of:

a) receiving first data from a first sensor;

b) displaying a first gauge display on a display adjacent a movable mechanical indicator, said first gauge display associated with said first sensor;

c) moving said indicator relative to said first gauge display based upon said first data from said first sensor to communicate information related to said first data from said first sensor when said first gauge display is displayed;

d) concealing said mechanical indicator after said steps a)–c);

e) displaying a second display on said display during said step d).

20. The method of claim 19 further including the steps of:

selectively obscuring said mechanical indicator; and displaying said second display while said mechanical indicator is obscured.

21. The method of claim 19 further including the steps of:

positioning a reconfigurable transparent display in front of said indicator;

forming said first gauge display and said second display on said display.

* * * * *